(12) United States Patent
De Wergifosse

(10) Patent No.: US 9,073,626 B2
(45) Date of Patent: Jul. 7, 2015

(54) ACTUATING BLADES OF AN UNDUCTED FAN

(75) Inventor: Eric De Wergifosse, Saint Augustin (FR)

(73) Assignee: LABINAL POWER SYSTEMS, Blagnac (FR)

( * ) Notice: Subject to any disclaimer, the term of this patent is extended or adjusted under 35 U.S.C. 154(b) by 484 days.

(21) Appl. No.: 13/641,738

(22) PCT Filed: Apr. 20, 2011

(86) PCT No.: PCT/FR2011/050917
§ 371 (c)(1),
(2), (4) Date: Oct. 17, 2012

(87) PCT Pub. No.: WO2011/135236
PCT Pub. Date: Nov. 3, 2011

(65) Prior Publication Data
US 2013/0058789 A1    Mar. 7, 2013

(30) Foreign Application Priority Data

Apr. 30, 2010   (FR) ..................................... 10 53350

(51) Int. Cl.
| | |
|---|---|
| *B64C 11/44* | (2006.01) |
| *F04D 29/36* | (2006.01) |
| *B64C 11/06* | (2006.01) |
| *F04D 25/06* | (2006.01) |
| *B64D 27/02* | (2006.01) |

(52) U.S. Cl.
CPC ............. *B64C 11/44* (2013.01); *F04D 25/0613* (2013.01); *F04D 29/362* (2013.01); *B64C 11/06* (2013.01); *B64D 2027/026* (2013.01); *Y02T 50/66* (2013.01)

(58) Field of Classification Search
CPC ... F04D 25/0613; F04D 29/362; B64C 11/06; B64C 11/44; B64C 11/32; B64C 11/325; F03D 7/0224
USPC ......................................................... 416/155
See application file for complete search history.

(56) References Cited

U.S. PATENT DOCUMENTS

| | | | |
|---|---|---|---|
| 2,974,730 A | 3/1961 | Voisard | |
| 5,451,141 A * | 9/1995 | Carvalho et al. | 416/152 |

(Continued)

FOREIGN PATENT DOCUMENTS

| | | |
|---|---|---|
| FR | 2 913 935 | 9/2008 |
| GB | 577 870 | 6/1946 |
| GB | 799 899 | 8/1958 |

OTHER PUBLICATIONS

International Search Report Issued Aug. 25, 2011 in PCT/FR11/050917 Filed Apr. 20, 2011.

*Primary Examiner* — Ninh H Nguyen
(74) *Attorney, Agent, or Firm* — Oblon, McClelland, Maier & Neustadt, L.L.P.

(57) ABSTRACT

An actuator device for actuating a swivel-mounted member carried by a rotor of a propulsion engine including: at least one electricity source; an electric actuator for swiveling the swivel-mounted member; a power supply circuit connecting the electricity source to the actuator; and an inertial device connected to the power supply circuit, the inertial device configured to convert electrical energy coming from the power supply circuit into mechanical energy, to store the mechanical energy, and to convert the mechanical energy into electrical energy for the power supply circuit.

10 Claims, 2 Drawing Sheets

(56) References Cited

U.S. PATENT DOCUMENTS

| | | | |
|---|---|---|---|
| 5,595,474 A * | 1/1997 | Girard | 416/1 |
| 5,931,637 A * | 8/1999 | Wheeler | 416/35 |
| 8,162,611 B2 * | 4/2012 | Perkinson et al. | 416/162 |
| 2008/0308685 A1 | 12/2008 | Decker | |
| 2010/0170981 A1 | 7/2010 | Belleville | |

* cited by examiner

ACTUATING BLADES OF AN UNDUCTED FAN

BACKGROUND OF THE INVENTION

The invention relates to the field of propulsion engines in which a rotor carries swivel-mounted elements.

One type of known propulsion engine that is used in particular in aviation is known as an open rotor or unducted fan engine.

In that type of engine, the rotor carries a plurality of blades that can be swivelled in order to vary their pitch relative to the rotor. Thus, one or more actuators is/are provided for modifying the pitch of the blades. Depending on the pitch that is to be given to the blades and depending on the aerodynamic stresses that are exerted on the blades, the actuator may need to act either as a motor or as a brake.

By way of example, the actuator may be an electric actuator. Under such circumstances, it needs to be supplied with electrical power when it operates as a motor, and it is also necessary to recover the power that it delivers when it operates as a brake.

For this purpose, it is known to use a power supply circuit connecting an electricity source to the actuator. The power supply circuit comprises a direct current (DC) power supply bus and a rectifier/inverter connecting the bus to the actuator. When the actuator operates as a motor, the bus transmits power from the source to the rectifier/inverter, which then operates as an inverter and powers the actuator with an alternating current (AC) voltage. When the actuator operates as a brake, the AC voltage delivered by the actuator is rectified by the rectifier/inverter and dissipated in a dissipation resistance connected to the power supply bus.

That solution presents several drawbacks.

Firstly, the electricity source needs to be dimensioned so as to be capable of delivering the power needed by the actuator when performing a large amplitude motor operation. Typically, the source must for example deliver a peak power of 3300 watts (W). This power is well above the power needed by the actuator for performing small positioning movements on a continuous basis, where that power is typically of the order of 500 W. This high power needs to be transmitted from the stator to the rotor, thereby leading to design constraints.

Furthermore, given the small amount of dissipation resulting from movement of the blades and the high level of efficiency of the actuator, the major part of the power delivered by the source while the actuator is operating as a motor needs to be dissipated in the dissipation resistance while the actuator is operating as a brake. Typically, using the above values, the resistance needs to be capable of dissipating a peak power of 2800 W and a continuous power of 300 W.

Finally, it is known that certification rules applicable to propulsion engines require any electrical system that has an impact on the thrust to be provided in redundant manner. Thus, the source, the power supply bus, the dissipating resistance, and the rectifier/inverter need to be provided in redundant manner. It is therefore necessary to provide two dissipation resistances even though installation constraints may lead to available volumes being relatively small, thereby also having an impact on the size of heat exchangers and/or dissipators.

Document US 2008/0308685 describes a solar powered flying wing having propellers with variable-pitch blades. Nevertheless, that document does not described in detail the motors used for controlling those propellers. In particular, that document does not describe an electrical actuator carried by a rotor of the propellers. Furthermore, the flywheels described in that document are situated inside the structure of the flying wing. Thus, that document does not provide a solution to the high peak power problem that needs to be transmitted from the stator to the rotor in order to power an electrical actuator of a swivel-mounted blade carried by the rotor.

There thus exists at present a need for a solution that enables a swivel-mounted member of an engine rotor to be actuated more efficiently.

OBJECT AND SUMMARY OF INVENTION

To this end, the invention provides an actuator device for actuating a swivel-mounted member carried by a rotor of a propulsion engine, the actuator device comprising:
  at least one electricity source;
  an electric actuator for swivelling said swivel-mounted member; and
  a power supply circuit connecting said electricity source to said actuator;
  the actuator device being characterized in that it further comprises an inertial device connected to said power supply circuit, said inertial device being suitable for converting electrical energy coming from said power supply circuit into mechanical energy, for storing said mechanical energy, and for converting said mechanical energy into electrical energy for said power supply circuit.

By means of these characteristics, when the actuator operates as a motor, at least some of the energy can be delivered by the inertial device. Thus, the electricity source does not need to be dimensioned so as to be capable of delivering the maximum power that the actuator might need. Furthermore, when the actuator is operating as a brake, at least some of the energy it delivers may be stored by the inertial device. Thus, energy dissipation can be limited. There is no need to provide a dissipation resistance.

The actuator device may comprise a second electricity source and a second power supply circuit, said inertial device being connected to said second power supply circuit, said inertial device being suitable for converting electrical energy coming from said second power supply circuit into mechanical energy, and for converting said mechanical energy into electrical energy for said second power supply circuit. This enables the power supply circuit to be provided in redundant manner, the inertial device being common to both power supply circuits.

In an embodiment, the power supply circuit comprises:
  a DC power supply bus connected to the electricity source;
  a first rectifier/inverter connected firstly to the power supply bus and secondly to said electric actuator; and
  a second rectifier/inverter connected firstly to said power supply bus and secondly to said inertial device.

Under such circumstances, the actuator device may comprise a control device suitable for controlling said inertial device as a function of a difference between the voltage delivered by the electricity source and the voltage of the power supply bus.

In an embodiment, the inertial device comprises a rotary member, the control device being suitable for controlling said inertial device as a function of a difference between a speed of rotation of said rotary member and a setpoint speed.

The control device may be suitable for determining a torque setpoint, said control device including a torque limiter.

The inertial device may include an electric motor having an internal or external rotor. The electric motor may present a flywheel.

The invention also provides a propulsion engine having a rotor carrying at least one swivel-mounted blade, said propulsion engine including an actuator device of the above invention, the actuator of the actuator device being connected to said blade.

Under such circumstances, the power supply circuit and the inertial device may be carried by said rotor.

BRIEF DESCRIPTION OF THE DRAWINGS

Other characteristics and advantages of the present invention appear from the description made below with reference to the accompanying drawings that show an embodiment having no limiting character. In the figures.

DETAILED DESCRIPTION OF AN EMBODIMENT

Figure 1:
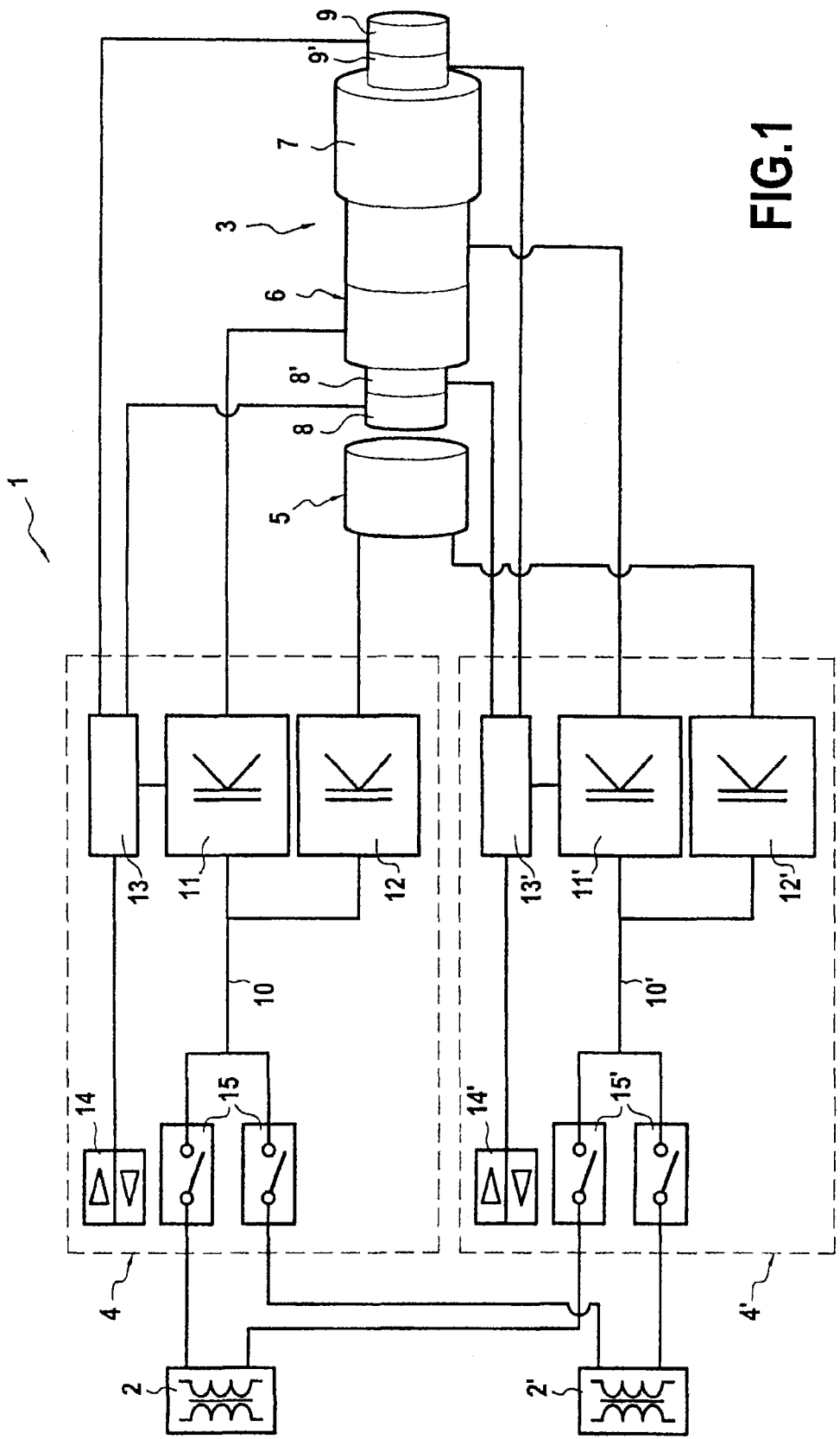
FIG. 1 is a diagram of an actuator device in an embodiment of the invention.

FIG. 1 is a diagram of an actuator device 1 in an embodiment of the invention. The actuator device 1 is for swivelling a swivel-mounted member carried by the rotor of a propulsion engine (not shown). For example, the actuator device serves to vary the pitch of the blades of an engine of the open rotor or non-ducted fan type.

The actuator device 1 has two electricity sources 2, 2', an actuator 3, two power supply circuits 4, 4, and an inertial device 5.

Each of the electricity sources 2, 2' serves to supply energy to each of the power supply circuits 4, 4'. The electricity sources 2, 2' have the special feature of needing to be able to pass energy from a stationary frame of reference to a rotating frame of reference (the rotor of the engine) that is rotating at a speed that may for example be 900 revolutions per minute (rpm). This constraint implies dimensioning that is particularly sensitive in terms of the power to be transmitted. Nevertheless, as explained below, the actuator device 1 does not require particularly high power. Thus, the electricity sources 2, 2' may be dimensioned for limited power.

The actuator 3 comprises an electric motor 6, a mechanical transmission 7, and sensors 8, 8', 9, and 9'.

By way of example, the electric motor 6 is of the brushless three-phase synchronous type having permanent magnets. It may operate as an electricity generator when it is driven mechanically. The electrical portions of the electric motor 6 are provided in redundant manner, as represented in FIG. 1 by a line subdividing the electric motor into two portions. The redundancy of the motor may be complete (two rotors and two stators one after another) or it may be a motor having two stator slots.

The mechanical transmission 7 connects the actuator 3 to the swivel-mounted member of the rotor of the engine. For this purpose and by way of example, the mechanical transmission 7 may either transform rotary movement into other rotary movement but at a different speed, or else it may transform rotary movement into movement in translation.

The sensors 8, 8' measure an angular position of the shaft of the electric motor 6. They are connected to respective control devices 13, 13' for controlling the electric motor 6. The sensors 9, 9' measure a position at the outlet from the mechanical transmission 7 (a position in rotation or in translation). They are also connected to respective ones of the control devices 13, 13', thereby making it possible to obtain accurate servo-control of position. The operation of the control devices 13, 13' is described in greater detail below. The actuator 3 may also include other sensors (not shown), e.g. for sensing temperature, in order to perform suitable monitoring.

The power supply circuit 4 comprises a DC power supply bus 10, a first rectifier/inverter 11, a second rectifier/inverter 12, and two interfaces 15. In similar manner, the power supply circuit 4' comprises a DC power supply bus 10', a first rectifier/inverter 11', a second rectifier/inverter 12', and two interfaces 15'. Below, the power supply circuit 4 is described in greater detail, the power supply circuit 4' being provided in redundant manner.

As shown in FIG. 1, the interfaces 15 serve to connect the power supply bus 10 either to the electricity source 2 or to the electricity source 2'. Thus, in the event of one of the electricity sources 2, 2' failing, or in the event of one of the power supply circuits 4, 4' failing, the actuator device 1 can remain operational. As shown in greater detail in FIG. 2, an interface 15 comprises a switch 16, a current limiter 17, and a unidirectional element 18.

The power supply bus 10 connects the interfaces 15 to the rectifier/inverter 11 and to the rectifier/inverter 12.

The rectifier/inverter 11 is connected to the actuator 3. In known manner, it is suitable for operating as an inverter, i.e. for transforming the DC voltage of the power supply bus 10 into a three-phase voltage for powering the actuator 3, and it is also suitable for operating as a rectifier, i.e. for transforming a three-phase voltage delivered by the actuator 3 into the DC voltage of the power supply bus 10. The mode of operation depends on controlling duty ratios.

The rectifier/inverter 12 is connected to the inertial device 5. It is suitable for operating as an inverter, i.e. for transforming the DC voltage from the power supply bus 10 into a three-phase voltage for powering the inertial device 5. It is also suitable for operating as a rectifier, i.e. for transforming a three-phase voltage delivered by the inertial device 5 into the DC voltage of the power supply bus 10.

The inertial device 5 comprises a rotary member, of the flywheel type, suitable for storing kinetic energy. Thus, the inertial device 5 may comprise a brushless synchronous electric motor. For example, the inertial device 5 comprises an electric motor having an internal rotor that includes a flywheel. In a variant, the inertial device 5 comprises an electric motor having an external rotor. Under such circumstances, the rotor may have sufficient inertia for a flywheel to be unnecessary. The electric motor of the inertial device 5 is preferably provided in redundant manner, one portion being connected to the rectifier/inverter 12 and another portion being connected to the rectifier/inverter 12'.

The inertial device 5 is preferably positioned coaxially about the center of rotation of the rotor in order to limit mechanical stresses associated with centrifugal acceleration.

As explained above, the actuator device 1 also has control devices 13, 13'. More precisely, the control device 13 has a first portion that is connected in particular to the sensors 8 and 9, and also to the circuit for controlling the rectifier/inverter 11 and the actuator 6, and a second portion that is connected to the circuit for controlling the rectifier/inverter 12. The first portion of the control device thus serves to control the actuator 6, and the second portion serves to control the inertial device 5. The control device 13 carried by the rotor of the engine is also connected to a transmission circuit 14 providing communication with the stationary portion. The control device 13' provides redundancy for the control device 13. Thus, it has a first portion that is connected in particular to the sensors 8' and 9', to the control circuits for the rectifier/inverter 11', and to the actuator 6, and a second portion that is connected to the control circuit for the rectifier/inverter 12'. The control device 13' is also connected to a transmission circuit 14'.

The control devices 13 and 13' are shown as unit devices in FIG. 1. Nevertheless, each of the portions of the control devices 13 and 13' may be constituted by distinct entities, e.g. in the form of digital circuits based on a principle of programmable logic (field programmable gate array (FPGA), ... ) or on a principle of one or more processors including control programs. In a variant, the control devices 13 may be implemented in the form of specific integrated circuits.

The operation of the actuator device 1 is described below with reference to the power supply circuit 4. Naturally, this operation is provided in redundant manner with the power supply circuit 4'.

When the actuator 3 is to act as a motor in order to swivel the blades with movement that requires power, the control device 13 controls the rectifier/inverter 11 to deliver the required AC voltage. The energy comes via the power supply bus 10 from the electricity source 2 or 2', and/or from the inertial device 5. The control device 13 may operate in parallel to cause the rotary member of the inertial device 5 to slow down and to convert the AC voltage that generates into a DC voltage for the rectifier/inverter 12.

When the actuator 3 is to operate as a brake in order to cause the blades to be swivelled with movement that generates power, the control device 13 controls the rectifier/inverter 11 to convert the AC voltage delivered by the actuator 3 into a DC voltage. In parallel, the control device 13 controls the rectifier/inverter 12 to take the power delivered to the power supply bus 10 and convert it into an AC voltage in order to accelerate the rotary member of the inertial device 5.

Thus, while the actuator 3 is operating as a motor, the necessary power is not delivered entirely by the electricity sources 2 or 2', and as a result they can be dimensioned in limited manner. Furthermore, during operation of the actuator 3 as a brake, the power it generates does not need to be dissipated in a dissipation resistance. On the contrary, it may be converted and stored for subsequent reuse.

The electricity sources 2 and 2' therefore need to supply only medium power corresponding to the losses of the control circuits and of the inertial device 5. Typically, in one example of dimensioning, the power that the sources 2 and 2' need to deliver may be 275 W instead of 3300 W peak and 500 W continuous for prior art solutions.

Furthermore, the energy dissipation corresponds essentially to the consumption of the control circuits and to the operating losses of the rectifier/inverters 11, 11', 12, 12'. Typically, the energy dissipation is 75 W, for example, to be compared with 350 W in prior art solutions.

There follows a description of an example of dimensioning for the inertial device 5. Consideration is given to actuating the blades through a large amplitude, typically requiring about 1 kilojoule (kJ). If an operating range of 5000 rpm to 7000 rpm is selected for the speed of rotation of the rotary member of the inertial device 5, then a moment of inertia of 0.010 kilograms meter square (kg*m$^2$) suffices. Such a moment of inertia is easily obtained with an electric motor having an internal rotor and a flywheel or with an electric motor having an external rotor. The torque produced over this range of speeds is limited to 7 newton meters (Nm) to 8 Nm. Operation at low speed also serves to limit magnetic losses and airgap ventilation losses.

Figure 2:
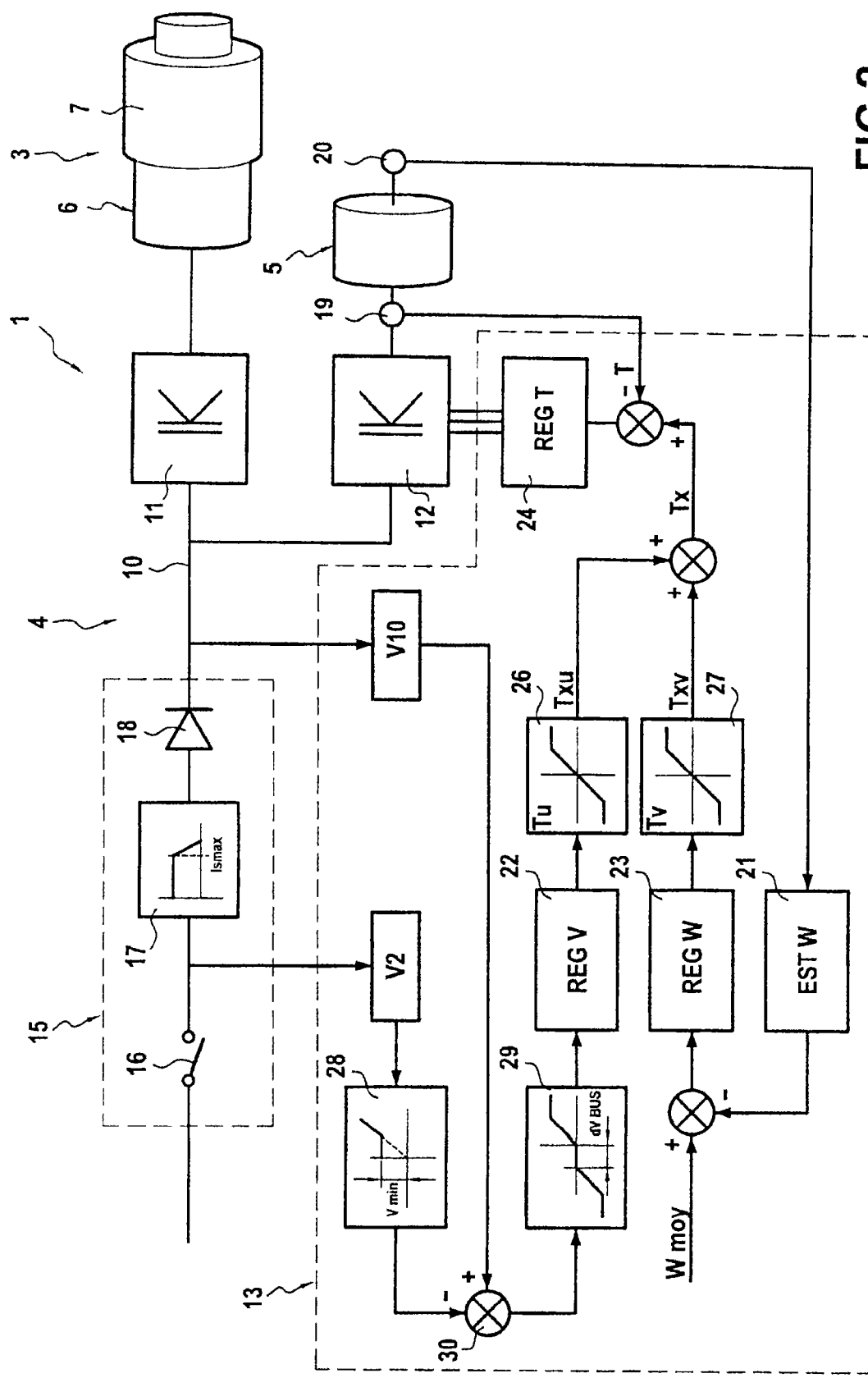
FIG. 2 shows a portion of the FIG. 1 actuator device.

FIG. 2 shows certain elements of FIG. 1. Furthermore, in the control device 13, there is shown diagrammatically an example of a control method that may be implemented by the second portion of the control device 13, i.e. the portion that controls the rectifier/inverter 12 for the inertial device 5. This example is described below. The first portion of the control device 13 may itself implement in conventional manner a torque loop that is governed by a speed loop that is itself governed by a position loop.

In addition to the above-mentioned sensors, the control device 13 is connected to a sensor (not shown) that measures the voltage V2 delivered by the electricity source 2 or 2' and a sensor (not shown) measuring the voltage V10 of the power supply bus 10. The voltage V10 may differ from the voltage V2, e.g. if the voltage V10 drops because the rectifier/inverter 11 is drawing current greater than the limit Ismax of the current limiter 17. Thus, the maximum power that the source can deliver is V2*Ismax.

The control device 13 is also connected to a sensor 19 measuring electric currents in the inertial device 5, thereby making it possible to determine the torque T of the inertial device 5, and to a sensor 20 measuring the speed of rotation W of the inertial device 5. In a variant, instead of the sensor 20, the control device 13 may estimate the speed of rotation W by means of an estimator 21 suitable for calculating the speed of rotation W as a function of variables stored by the control device 13.

The control device 13 implements a regulation loop that makes use in particular of a voltage regulator 22, a speed regulator 23, and a torque or current regulator 24.

The speed regulator 23 has as its input the difference between a speed setpoint Wmoy and the speed of rotation W of the inertial device 5, as measured by the sensor 20 or as estimated by the estimator 21. The output from the speed regulator 23 is a first torque setpoint Txv, limited by the torque limiter 27 to the range of values −Tv to +Tv. The threshold Tv is selected so that:

$$Wmoy*Tv<(V2*Ismax-\text{control circuit losses})$$

Thus, it is always possible to deliver the maximum torque that the speed regulator 23 can demand because of the power delivered by the electricity source 2 or 2'.

The input to the voltage regulator 22 depends on the difference between the voltage V2 and the voltage V10. Thus, the voltage regulator 22 delivers a second torque setpoint Txu, that is limited by the torque limiter 26 to the range of values −Tu to +Tu. This setpoint seeks to reduce the difference between the voltages V2 and V10 by imposing the direction and the amplitude of the power transfer between the power supply bus 10 and the inertial device 5. This power is close to the product of the speed of rotation W multiplied by the torque T. The maximum transferred power is thus Wmax*Tu, where Wmax is the maximum speed of rotation of the inertial device 5. The voltage regulator 22 is preferably of the proportional integral (PI) or the proportional integral derivative (PID) type.

The input to the voltage regulator 22 is not necessarily equal to the difference between the voltage V2 and the voltage V10.

A module 29 zeroes the input to the voltage regulator 22 when the difference between the voltages V10 and V2 is less than a threshold dVbus. So long as the power demand on the power supply bus 10 is less than the power V2*Imax, the current limiter 17 does not act and the voltage V10 is only very slightly less than V2. Under such circumstances, the voltage regulator 22 does not control torque. The module 29 thus makes it possible to avoid drawing energy from the inertial device 5 so long as the electricity source 2 or 2' is capable of delivering the power demanded from the power supply bus 10. In contrast, as soon as the current demanded from the power supply bus 10 exceeds Ismax, the current limiter 17 begins to act, and the difference between the voltages V2 and V10 exceeds dVbus. Under such circumstances, the voltage regulator 22 demands a torque Txu from the inertial device 5 seeking to reduce this difference.

Furthermore, a module 28 is placed upstream from the element 30 that determines the difference between the voltages V2 and V10. The module 28 provides a constant voltage Vmin when the voltage V2 is less than Vmin, e.g. in the event of the electricity sources 2, 2' failing. Thus, under such circumstances, even if the voltages V2 and V10 are zero or practically zero, the input to the speed regulator 22 is equal to Vmin−dVbus, and the speed regulator 22 demands a braking torque Txv having the effect of powering the power supply bus 10 from the inertial device 5. Thus, so long as the energy stored in the inertial device 5 makes this possible, the power supply bus 10 can be powered.

The torque setpoints Txv and Txu for the speed regulator 23 and the voltage regulator 22 are added in order to determine the overall torque setpoint Tx. The input to the torque regulator 24 corresponds to the difference between the overall torque setpoint Tx and the torque T as measured by the sensor 19. The torque regulator 24 operates in two quadrants, i.e. in only one direction of rotation with two torque directions.

Dynamic response of the voltage regulator 22 is faster than that of the speed regulator 23. In addition, the value Tu is much greater than the value Tv. Thus, the voltage regulator 22 has priority over the speed regulator 23. In other words, the torque from the inertial device 5 is determined mainly as a function of the difference between the voltages V2 and V10.

The actuator device 1, when controlled in the manner described above by the control device 13, operates as follows.

During stages in which the actuator 3 is operating at zero power or at a low level of motor power, i.e. when the power consumed by the elements connected to the power supply bus 10 is less than V2*Ismax:

If the speed of rotation W is equal to the setpoint speed Wmoy, the voltage regulator 22 does not request any torque since V10−V2<dVbus. The electricity source 2 or 2' provides all of the energy that is consumed. The energy consumers are: the control circuits for the rectifier/inverters 11 and 12 and for the actuator 3, the actuator 3, and the inertial device 5 that, under the effect of the speed regulator 23, requires power in order to maintain the speed Wmoy (compensating for losses due to example to bearings, air friction, magnetic losses, and Joule effect losses).

If the speed of rotation W is less than the setpoint Wmoy, the voltage regulator 22 does not demand any torque since V10−V2<dVbus. The electricity source 2 or 2' delivers all of the energy consumed. The energy consumers are: the control circuits for the rectifier/inverters 11 and 12 and for the actuator 3, the actuator 3, and the inertial device 5 that, under the effect of the speed regulator 23, requires power in order to accelerate up to the speed Wmoy. Because of the torque limiter 27, the power demanded for acceleration is less than or equal to Wmoy*Tv. The threshold Tv is selected so that this power is less than the available power (V2*Ismax−control circuit losses).

If the speed of rotation W is greater than the setpoint speed Wmoy, all of the energy is supplied by the inertial device 5. The speed regulator 23 imposes a braking torque Txv on the inertial device 5 having its value limited to Tv. This braking torque leads to power being transferred between the inertial device 5 and the power supply bus 10, with a value that is close to Txv*W. As a result, the voltage V10 will tend to increase. This increase in voltage has two effects: the first is to prevent any current coming from the electricity source 2, 2' (unidirectional element 18), and the second is to make use of the voltage regulator 22 (V10>V2). The voltage regulator 22 seeks to impose a torque Txu in the direction opposite to the torque of value Txv of the speed regulator, so as to limit the increase in the voltage V10. Equilibrium is found around the operating point (Txv−Txu)*W=the power of consumption on the power supply bus 10. The consumers of energy are the control circuits and the actuator 3.

During stages in which the actuator 3 is operating high levels of motor power, i.e. when the power consumed by the elements connected to the power supply bus 10 is greater than V2*Ismax: in this situation, given the current drawn from the power supply bus 10, the voltage V10 drops to a value V2−dVbus, thereby having the effect of making use of the voltage regulator 22, which requests a braking torque Txu from the inertial device 5 so as to make use of the stored kinetic energy. The speed regulator 23 seeks to maintain speed by attempting to impose a torque Txv opposite to that of the voltage regulator 22. However, the torque Txv is capped at Tv, which is much less than Tu. Equilibrium is found around the operating point: (Txu−Tv)*W+V2*Ismax=losses of the control circuit plus power consumed by the actuator 3.

During stages in which the actuator 3 is operating as a generator, and at high power, i.e. when the power transmitted from the actuator 6 to the power supply bus 10 is greater than the power consumed by the control circuits: in this situation, because of the current delivered to the power supply bus 10, the voltage V10 becomes greater than V2, thereby having the effect of blocking any power coming from the electricity source 2 or 2' and of making use of the voltage regulator 22. The voltage regulator 22 requests an acceleration torque for the inertial device 5 so as to extract the excess power available from the power supply bus 10 and store energy in the form of kinetic energy. The speed regulator 23 seeks to maintain speed by attempting to impose a torque Txv opposite to the torque from the voltage regulator 22.

Nevertheless, the torque Txv is capped at Tv, which is much less than Tu. Equilibrium is found around the operating point: (Txu−Tv)*W+losses of the control circuits=power delivered by the actuator 3.

Naturally, in a variant, other methods could be used for controlling the inertial device 5 in order to convert the electrical energy coming from the power supply circuit into mechanical energy, in order to store the mechanical energy, and in order to convert the mechanical energy into electrical energy for the power supply circuit, depending on the operation of the actuator 3.

The invention claimed is:

1. A propulsion engine comprising:
a rotor carrying at least one swivel-mounted blade and an actuator device connected to the blade, the actuator device comprising:
at least one electricity source configured to transfer electrical energy from a stationary frame of reference to the rotor;
an electric actuator carried by the rotor to steer the blade;
a power supply circuit carried by the rotor and connecting the electricity source to the actuator;
an inertial device carried by the rotor and connected to the power supply circuit, the inertial device configured to convert electrical energy coming from the power supply circuit into mechanical energy, to store the mechanical energy, and to convert the mechanical energy into electrical energy for the power supply circuit.

2. An engine according to claim 1, wherein the actuator device further comprises a second electricity source and a second power supply circuit, the inertial device being connected to the second power supply circuit, the inertial device configured to convert electrical energy coming from the second power supply circuit into mechanical energy, and to convert the mechanical energy into electrical energy for the second power supply circuit.

3. An engine according to claim 1, wherein the power supply circuit comprises:
- a DC power supply bus connected to the electricity source;
- a first rectifier/inverter connected to the power supply bus and to the electric actuator; and
- a second rectifier/inverter connected to the power supply bus and to the inertial device.

4. An engine according to claim 3, wherein the actuator device further comprises a control device configured to control the inertial device as a function of a difference between a voltage delivered by the electricity source and a voltage of the power supply bus.

5. An engine according to claim 4, wherein the inertial device includes a rotary member, the control device configured to control the inertial device as a function of a difference between a speed of rotation of the rotary member and a setpoint speed.

6. An engine according to claim 4, wherein the control device is configured to determine a torque setpoint, the control device including a torque limiter.

7. An engine according to claim 1, wherein the inertial device includes an electric motor including an internal rotor.

8. An engine according to claim 7, wherein the electric motor includes a flywheel.

9. An engine according to claim 1, wherein the inertial device includes an electric motor including an external rotor.

10. An engine according to claim 9, wherein the electric motor includes a flywheel.

\* \* \* \* \*